Patented Oct. 20, 1931

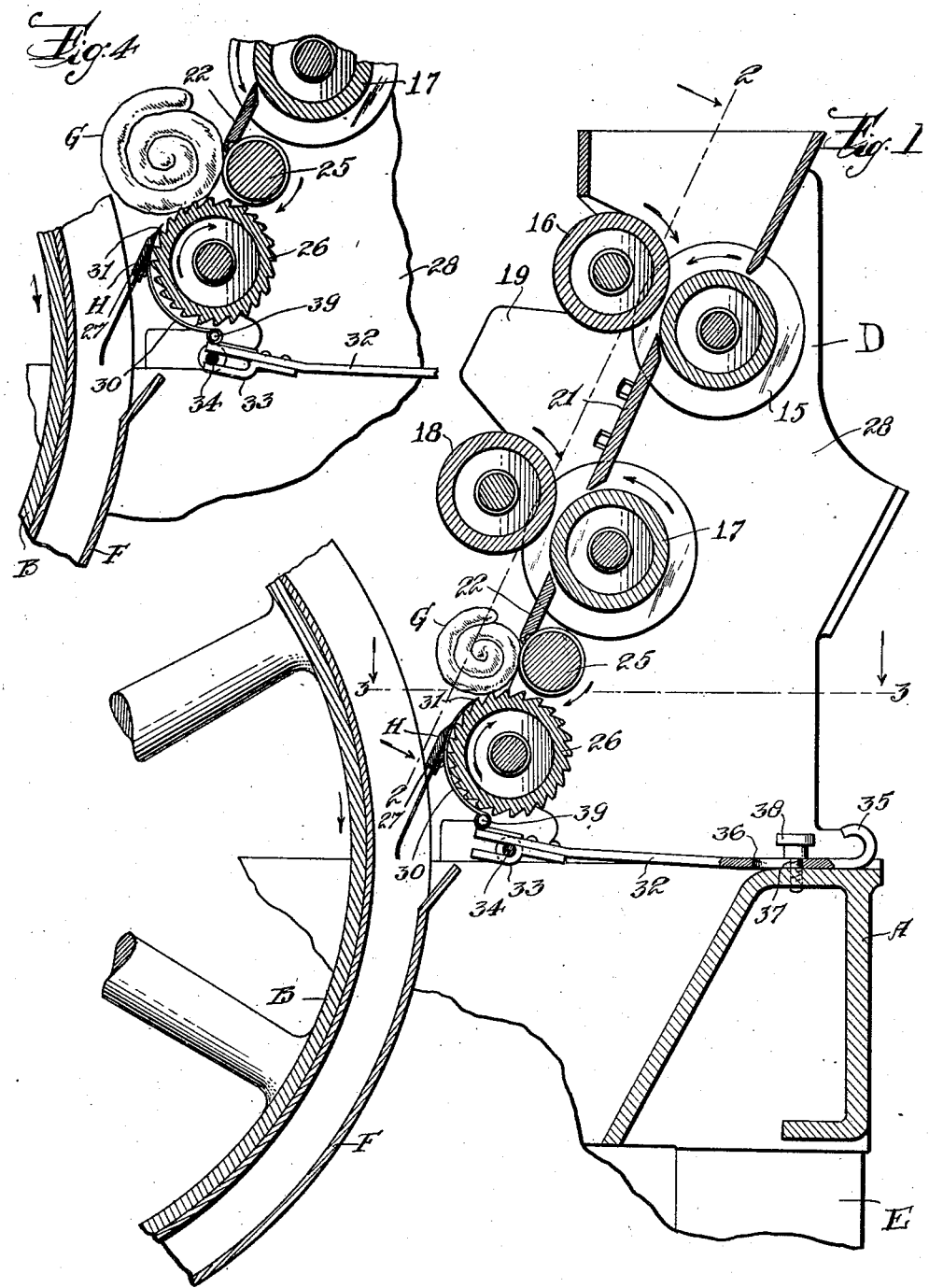

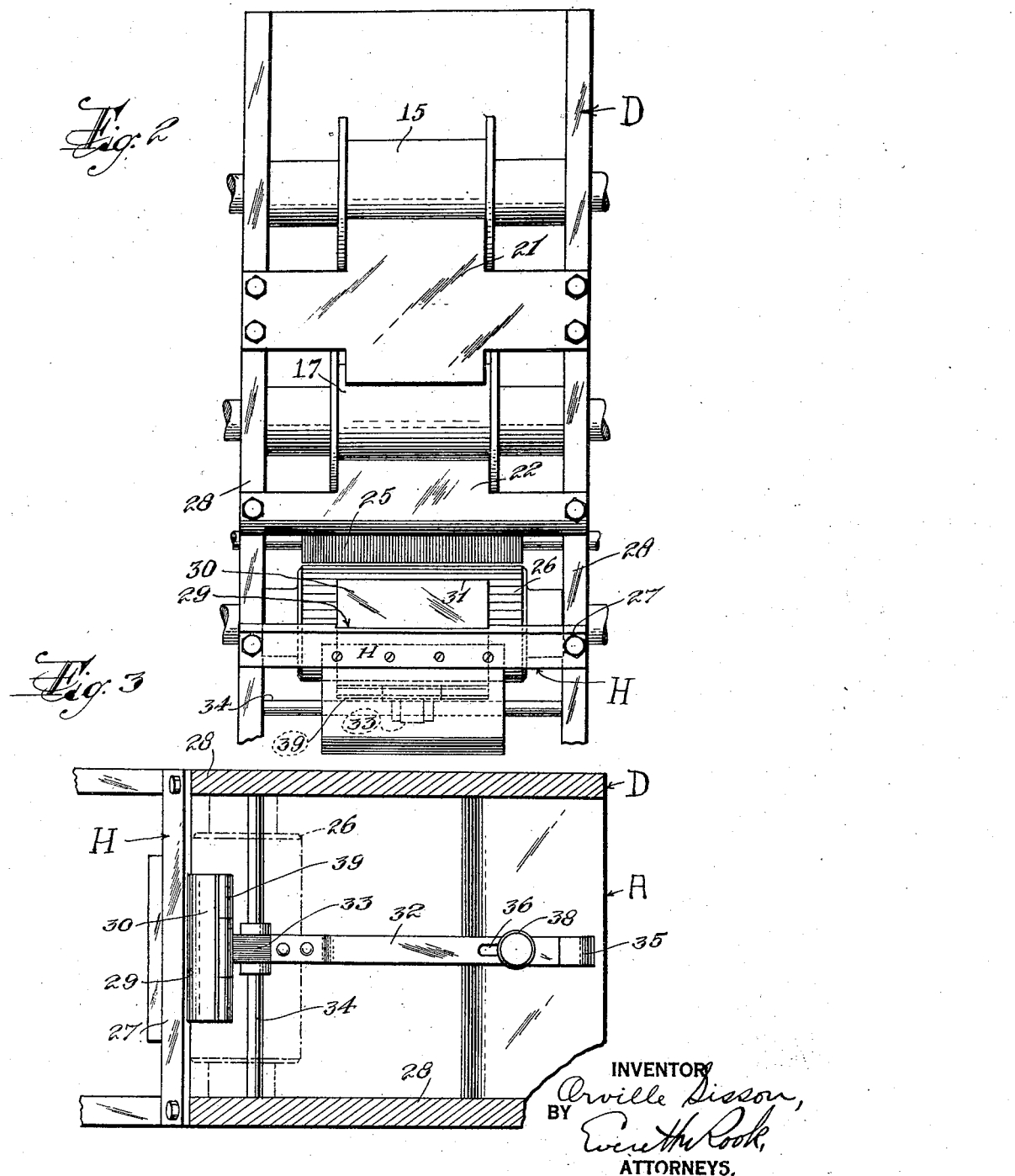

1,827,958

UNITED STATES PATENT OFFICE

ORVILLE SISSON, OF HERINGTON, KANSAS, ASSIGNOR, BY DIRECT AND MESNE ASSIGNMENTS, OF ONE-HALF TO THOMSON MACHINE COMPANY, A CORPORATION OF NEW JERSEY, AND ONE-HALF TO THE J. H. DAY COMPANY, OF CINCINNATI, OHIO, A CORPORATION OF OHIO

ADJUSTABLE CURLER APRON FOR DOUGH MOLDING MACHINES

Application filed June 6, 1928. Serial No. 283,164.

This invention relates in general to a dough molding machine of the type described in United States Patent No. 701,646, to C. A. Thomson, June 3, 1902, in which a ball or lump of dough is first rolled between driven rollers into a thin sheet which is subsequently automatically spirally rolled to form a substantially cylindrical loaf, said loaf being then subjected to a rolling and squeezing pressure between a rotating drum and a semicircular compression plate to knead or work the dough into proper condition for the pan. Such machines usually include a loaf forming mechanism which comprises a smooth roller arranged beneath the lower part of the dough sheeting mechanism, and a fluted roller arranged beneath the smooth roller and adjacent the drum, the fluted roller and the smooth roller cooperating to form the sheet of dough into a spiral roll which is deposited between the rotating drum and the compression plate. It has been found that when the spirally rolled loaf is smaller than normal, it will remain indefinitely between the fluted roller and the smooth roller and when it is thrown off the fluted roller it falls between the drum and the compression plate in a diagonal or endwise position so that the kneading operation produces an imperfect loaf. If the spiral roll is larger than normal it will not remain upon the fluted roller long enough for satisfactory curling or spiral rolling.

One object of my invention is to provide an adjustable apron upon the fluted roller which is also commonly called the curler so that the extent of the periphery of the fluted roller exposed between the edge of the apron and the smooth roller can be varied as desired, to ensure proper operation of the curling mechanism upon the different amounts of dough, and proper discharge of the loaf.

Other objects are to provide an adjustable curler apron which includes a sheet of metal and means for moving it peripherally or circumferentially of the fluted roller; to provide an adjustable apron of this character which can be easily and quickly manually adjusted to accommodate many different amounts of dough; to provide such mechanism which is simple and inexpensive in construction and can be operated by an unskilled person, and to obtain other advantages and results as may be brought out by the following description.

Referring to the accompanying drawings, in which corresponding and like parts are designated by the same reference characters throughout the several views, Figure 1 is a vertical longitudinal sectional view through the dough sheeting and loaf forming mechanism of a dough molding machine, showing my adjustable curler apron applied thereto and adjusted for small amounts of dough.

Figure 2 is a transverse vertical sectional view taken on the line 2—2 of Figure 1.

Figure 3 is a horizontal sectional view taken on the line 3—3 of Figure 1, showing the adjustable curler apron in top plan view, and Figure 4 is a fragmentary vertical longitudinal sectional view through the loaf forming mechanism showing the curler apron adjusted for large pieces of dough.

Referring particularly to Figures 1 and 2 of the drawings, the reference character A designates the main frame of the machine on one end of which is journaled a kneading drum B one side of said drum being positioned adjacent a dough sheeting and loaf forming mechanism D mounted at the end of the frame opposite the drum. The main frame A is supported by legs or standards E, and the frame of the dough sheeting and loaf forming mechanism D is superposed upon the main frame.

The said dough sheeting and loaf forming mechanism includes two pairs of sheeting rollers 15, 16 and 17, 18 longitudinally spaced on the frame of the mechanism D. One of the rollers of each of said pairs, in the present instance the rollers 16 and 18 are adjustable toward and away from the corresponding rollers 15 and 17 by means of suitable known adjusting mechanism including a slide 19 carrying the rollers 16 and 18 and slidably mounted in guideways at opposite sides of the machine. A hopper 24 is arranged above the uppermost sheeting rollers 15, 16 to receive a lump or ball of dough and guide the same between the sheeting rollers. All of said rollers 15, 16 and 17, 18 are intergeared and driven together from a motor 1 by any suitable means in the directions indicated by the arrows so as to force the dough between the rollers of each pair. The dough passing between the said rollers is formed into a sheet and then is operated upon by a curling and loaf forming mechanism which spirally rolls the sheet into a substantially cylindrical loaf. A guide plate 21 is mounted on the frame to bridge the space between the rollers 16 and 17 and guide the sheet from one pair of rollers to the other pair and a similar plate 22 is arranged between the lowermost sheeting roller 17 and the threaded roller 25 of the loaf forming mechanism about to be described.

This loaf forming mechanism includes a screw-threaded roller 25 arranged beneath the lower part of sheeting rollers 17, 18, and a fluted roller 26 arranged beneath the theaded roller 25 and adjacent the drum B. The rollers 25 and 26 of the loaf forming mechanism and the drum B are driven in the direction indicated by the arrows through suitable gearing not shown.

A compression plate F of sheet metal surrounds the lower half of the kneading drum B in spaced relation thereto to form a channel between said drum and the compression plate. The loaf G formed by the curling roller 26 is deposited by action of gravity over an apron H into the said channel and rolled with a squeezing pressure between the drum and the compression plate to the opposite side of the drum whereby the loaf is properly kneaded and worked into a condition for baking.

My invention relates particularly to the apron H which is shown as comprising a plate 27 secured at its opposite ends to opposite sides 28 of the frame of the dough sheeting and loaf forming mechanism D, said plate extending parallel to the fluted roller 26 and in slightly spaced relation thereto. The surface of the plate 27 nearest the periphery of the roller 26 is formed with a groove 29 in which is slidably mounted an adjustable apron plate 30 which is shown as arcuate and substantially concentric with the roller 26. This apron plate 30 is movable circumferentially of the roller 26 by any suitable means so that the amount of the periphery of the roller 26 between the edge 31 of said apron plate and the smooth roller 25 can be varied as desired. Such actuating means is shown as comprising a bar 32 having a forked end 33 slidably embracing a rod 34 extending transversely between the side pieces 28 of the frame D. The other end of the bar slidably rests upon the top of the main frame A and has a returned extremity 35 to serve as an operating handle. The bar has a slot 36 through which passes a thumb screw 37 which is screw-threaded into the top of the main frame A and has an operating knob 38 which upon rotation of the thumb screw serves to clamp the bar 32 between the main frame A and said knob. The bifurcated end of the bar is pivotally connected as at 39 to the lower edge of the apron plate 30. With this construction it will be observed that by longitudinally moving the bar 32, the apron plate 30 may be circumferentially moved with respect to the roller 26, and the thumb screw 37 will hold the apron plate in adjusted position. The apron plate is guided in its movements by cooperating of the groove 29 in the plate 27 and the periphery of the roller 26.

In operation of the machine, when small amounts of dough are being formed into loaves the edge 31 of the apron plate is adjusted to a position close to the threaded roller 25 as shown in Figure 1, while with larger quantities of dough, the edge 31 of the apron is moved farther away from the threaded roller according to the quantity of dough, as shown in Figure 4. It is thus possible to ensure that the spirally rolled loaf G will be discharged or stripped from the roller 26 as soon as it has been spirally rolled, and the loaf will be so discharged with its axis substantially parallel with the axis of the drum B as is desirable.

While I have shown one specific form of adjustable curler apron and actuating mechanism therefor it will be understood that this is primarily for the purpose of illustrating the principles of the invention and that many modifications and changes may be made in the details of construction without departing from the spirit or scope thereof.

Having thus described my invention, what I claim is:

In a dough molding machine the combination with a roller and another roller rotating in the same direction to form a sheet of dough into a spiral roll, and kneading means for receiving said roll from said rollers, of an apron for guiding said spiral roll from said rollers to said kneading means, comprising a main plate arranged substantially parallel with the first-mentioned roller and having a guide groove in the side adjacent said first-mentioned roller, an apron plate movable in said guide groove between said main plate and said first-mentioned roller toward and from the second-mentioned roller and covering a portion of the surface of said first-mentioned roller, and means for moving said apron plate circumferentially of said first-mentioned roller.

ORVILLE SISSON.